United States Patent [19]

Fan

[11] Patent Number: 4,582,122

[45] Date of Patent: Apr. 15, 1986

[54] EFFICIENT WASTE HEAT RECOVERY PROCESS FROM SULFUR CONTAINING FLUE GAS

[75] Inventor: Chung T. Fan, Lyndhurst, N.J.

[73] Assignee: Linde Aktiengesellschaft, Wiesbaden, Fed. Rep. of Germany

[21] Appl. No.: 521,800

[22] Filed: Aug. 10, 1983

[51] Int. Cl.[4] .............................................. F28D 17/00
[52] U.S. Cl. ........................................ 165/1; 55/73;
55/80; 55/267; 165/4; 165/7; 122/DIG. 1;
122/DIG. 2; 423/542
[58] Field of Search ..................... 55/73, 80, 267, 268,
55/269; 165/7, 1, 4, 10, 134, 111, DIG. 12,
DIG. 28, DIG. 18; 122/DIG. 1, DIG. 2;
110/304, 302, 203, 216; 423/540, 542

[56] References Cited

U.S. PATENT DOCUMENTS

| | | | |
|---|---|---|---|
| 2,863,723 | 12/1958 | Tigges | 165/7 |
| 3,203,472 | 8/1965 | Brandt | 165/10 |
| 4,129,176 | 12/1978 | Heyn et al. | 110/304 |
| 4,206,722 | 6/1980 | Nolley, Jr. | 110/302 |
| 4,378,977 | 4/1983 | Linde et al. | 55/73 |

FOREIGN PATENT DOCUMENTS

| | | | |
|---|---|---|---|
| 63195 | 10/1982 | European Pat. Off. | 55/80 |
| 202412 | 12/1982 | Japan | 110/203 |

*Primary Examiner*—Albert W. Davis, Jr.
*Attorney, Agent, or Firm*—Millen & White

[57] ABSTRACT

In the recovery of waste heat from flue gas containing particulate solids, $CO_2$, $SO_2$, $SO_3$ and $H_2O$, several improvements are provided, e.g., passing hot flue gas, e.g., from a power plant, over heat exchange surface attackable by sulfuric acid, e.g., in a combustion air preheater, so as to release heat to said heat exchange surface and to partially cool said flue gas to a temperature within the range of about 350° F. to above the condensation temperature of sulfuric acid; passing resultant partially cooled gas through a particulate removal zone to separate the particulate solids from the partially cooled flue gas; passing resultant solids-depleted, partially cooled flue gas to a regenerator containing heat exchange surface resistant to attack by sulfuric acid to release additional heat and to cool said flue gas to a temperature below the condensation temperature of sulfuric acid; and recovering the heat from the regenerator with air which is then passed through the air preheater to be used as combustion air for the furnace.

2 Claims, 2 Drawing Figures

EFFICIENT WASTE HEAT RECOVERY PROCESS FROM SULFUR CONTAINING FLUE GAS

BACKGROUND OF THE INVENTION

This invention relates to the recovery of energy from hot exhaust gases, and in particular, from exhaust gases produced by the combustion of sulfur-containing fuels, especially in the operation of a power plant.

The problem of disposing of exhaust gases from combustion produced by sulfur-containing fuel is a major concern worldwide. Due to the high corrosiveness of sulfuric acid which condenses near 280° F., the heat recovery of the flue gas usually by means of an air preheater or economizer has been limited to 300° F.

Furnaces using sulfur-containing fuels, especially coal, generally employ a flue gas desulfurization process (FGD) prior to discharge to the stack. Most FGD processes precool the flue gas to low temperatures, e.g., 110° to 150° F. by mixing the flue gas with a large amount of water in the front section of a scrubber. It is extremely difficult to recover the heat because of corrosion problems and the temperature level. Therefore a large amount of energy is wasted.

For more than a half century, stone or ceramic packed regenerators have been used for heat/cold recovery and purification in various industries, especially in coke oven gas plants for hydrogen and air separation plants. Recently several patents have been issued or applied for using such regenerators for exhaust heat recovery, i.e. U.S. Pat. No. 4,265,088 by H. Funk, and German Patent Application No. P 31 39 153.2, by G. Linde (also described in Dr. Linde's article "Improved Energy Generation from Combustion Processes as a Result of Optimum Utilization of Flue Gas Exhaust Heat", Linde Reports on Science and Technology, 34/1982, pp. 34–38). H. Funk's patent employs compression and expansion of the gas and is not readily adaptable for combustion air preheating. G. Linde's system employs regenerators for combustion air preheating to replace conventional air preheaters, but is not readily adaptable to combustion gases containing particulates since it will require either the lowering of the combustion air temperature or the operation of the particulate removal unit at a much higher temperature than normal. The reason for these alternatives is that the regenerators must be used downstream of the particulate removal equipment (i.e. electrostatic precipitator or baghouse) to avoid becoming plugged, the plugging being otherwise especially acute when coal is burned. The highest temperature achievable for the combustion air from the regenerator is thus limited by the electrostatic precipitator or baghouse which is normally operated at less than 350° F., much lower than the combustion air temperature (500°–600° F.) normally used. To raise the combustion air temperature to such a high level requires operating the precipitator, flue gas blower and regenerator at temperatures of more than 200 degrees above normal. With conventional technology, this can be quite costly and power consuming. Conversely, there is presently being developed by Hans D. Linhardt a high temperature particle separator for particle control in coal gasification plants, details of which are described in Report No. L & A 1100-13 dated Feb. 28, 1983, "Final Technical Report—Design and Development of a High Temperature Particle Separator for Particle Control in Coal Gasification Plants" by Hans D. Linhardt, under Contract No. De-AC01-81 FEO 5120 for the U.S. Department of Energy, Division of Coal Conversion and Utilization, and also U.S. patent application, Ser. No. 345,073 dated Feb. 4, 1982, "Axis Symmetrical Separator for Separating Particulate Matter from a Fluid Carrying Medium" by Hans D. Linhardt, the government report being incorporated by reference herein, and to the extent permitted by Hans D. Linhardt, the patent application as well.

Furthermore, in the utilization of the flue gas waste heat, there is the problem of recovering the low grade of energy available due to the relatively low temperature level involved with G. Linde's process. Even with H. Linhardt's U.S. Pat. No. 4,292,050 using a Rankine Cycle to generate electricity from the waste heat, low efficiencies are usually obtained.

SUMMARY

An object of the present invention is to provide improved processes and associated apparatuses to recover waste heat from flue gas.

Upon further study of the specification and appended claims, further objects and advantages of this invention will become apparent to those skilled in the art.

To attain these objects, there are provided improvements in a process for the recovery of heat from a flue gas by heat exchange with air, said flue gas being generally at about 620°–750° F. and comprising particulate solids, $CO_2$, $SO_2$, $SO_3$, and $H_2O$. One improvement comprises (a) passing hot flue gas over heat exchange surface attackable by sulfuric acid, so as to release heat to said heat exchange surface and to partially cool said flue gas to a temperature within the range of about 350° F. to above the condensation temperature of sulfuric acid; (b) passing resultant partially cooled gas through a particulate removal zone to separate the particulate solids from the partially cooled flue gas; and (c) passing resultant solids-depleted, partially cooled flue gas to a regenerator containing heat exchange surface resistant to attack by sulfuric acid to release additional heat and to cool said flue gas to a temperature below the condensation temperature of sulfuric acid.

By "heat exchange surface attackable by sulfuric acid" is meant, in general, such surface that requires replacement in less than eight years. This would include not only carbon steel but also stainless steel used in the operation of a preheater wherein the high rate of flow coupled with diluted sulfuric acid could result in an unacceptable rate of corrosion.

In a preferred embodiment of the invention, the flue gas is passed through a conventional power plant air preheater comprising metallic, e.g., carbon steel, heat exchange surface attackable by sulfuric acid, e.g., a Ljungstrom C-E air Preheater by Combustion Engineering Inc. of Wellsville, N.Y. 14895, where the flue gas is cooled down to an acceptable inlet temperature, e.g., about 290°–350° F., for a conventional particle separator, e.g., a baghouse or electrostatic separator. Alternatively, the flue gas can be withdrawn from the preheater at an intermediate temperature, e.g., about 480°–520° F., and then further cooled against boiler feed water to the range of about 290°–350° F. in a waste heat exchanger also having heat exchange surfaces attackable by sulfuric acid. In either case, the flue gas cleaned of particulates is then passed to a conventional regenerator system containing heat exchange packing resistant to attack by sulfuric acid, e.g., acid resistant ceramics which need not be replaced because of corrosion for at least fifteen years, especially thirty years and longer, since acid attack by the sulfuric acid is believed to be theoretically impossible.

In another embodiment of the invention, the flue gas at about 620°–750° F. and comprising particulate solids, $CO_2$, $SO_2$, $SO_3$ and $H_2O$ is first treated in a high temperature particle separator, e.g. of the Lindhardt type, to remove the particulate solids. Thereafter, the solids-depleted flue gas at substantially the same temperature of about 620°–750° F. is passed over heat exchange surface attackable by sulfuric acid, bringing the temperature of the flue gas down to a temperature within the range of about 550° F. to above the condensation temperature of sulfuric acid, e.g., 550°–510° F., against boiler feed water. Thereafter, the flue gas is passed to the same type of regenerator system described heretofore.

The heat stored in the regenerator is recovered in one of several ways. According to one embodiment, ambient air is passed through the regenerator, whereby the air is heated to above the condensation temperature of sulfuric acid, e.g., about 290°–330° F. It is then passed through a preheater, e.g., of the Ljungstrom type, so that the air is heated to the usual temperature range of combustion air of about 510°–640° F. In this embodiment, the preheater requires less heat exchange surface than required in prior art processes.

Another method of recovering the regenerator heat comprises passing the air from the regenerator to a conventional waste heat exchanger against boiler feed water, and then passing the resultant cooled air through the preheater. In this method, the regenerator system is provided with a cycle to remove sulfuric acid from the regenerator prior to introducing air for combustion therein. Otherwise, the combustion air would vaporize sulfuric acid which would then condense in the conventional waste heat exchanger and attack the heat exchange surfaces therein.

Because the flue gas has a higher heat capacity than air, the heat balance for regenerators allows for the recovery of excess heat by branching off a heated air stream from the regenerators. This heated branched-off air stream can be used for heating the desulfurized air from the FGD process which otherwise would be too cool at 100° F. for facile removal by the stack. Conversely, the heated air containing purged $H_2SO_4$ can be recycled to the flue gas or to the combustion air downstream of the preheater for decomposition in the furnace.

In addition, the invention provides the following process features and advantages.

(1) The normal combustion air temperature of about 500° to 650° F. and normal flue gas temperature leaving the economizer of about 620°–750° F., is maintained; therefore no significant modification in the boiler is required. By using this invention, a conventional electrostatic precipitator or a baghouse system can be used at a conventional temperature of 300° F.; so no expensive modification is required. The temperature approach in the air preheater is almost identical to the conventional design but with about half of the depth of the normal preheater. Therefore no special engineering of the preheater is required and existing unit may be used by just reducing the depth of the preheater.

(2) The waste heat from the flue gas can be used to preheat the boiler feed water. Conventionally, the boiler feed water is heated with turbine extractions, and the turbine extraction requires temperatures much higher than the boiler feed water to prevent heat transfer line crossing. By using the hot flue gas to preheat the boiler feed water, significant savings can be made on turbine extractions having temperatures higher than the flue gas. In this way, the use of low grade waste heat from the flue gas replaces the use of high grade heat contained in extraction steam. This results in an increase of about 3 to 4% of total power generation by the turbine.

(3) By use of regenerators, the flue gas can transfer its heat to the sulfuric acid resistant solid heat exchange media, e.g., ceramic packing (or other inert type material), in one of the vessels at temperatures much lower than the sulfuric acid dewpoint. This heat will be used to heat up the combustion air in the opposite flow direction in another vessel. The regenerator vessels will be switched every few minutes. Corrosion problems are avoided by the use of non-corrosive materials for the packing and the internal lining of the regenerators.

(4) For an existing power plant with a full size air preheater already installed, it is advantageous to employ a process wherein the heat absorbed from the regenerators will be used to preheat the boiler feed water in a heat exchanger. The flue gas will deliver the low grade heat to the regenerator where sulfuric acid will form and deposit. Extra air can be used first to purge out the sulfuric acid by vaporization, then the following combustion air will be practically acid free.

BRIEF DESCRIPTION OF DRAWINGS

The figures are directed to preferred embodiments of the invention, it being understood that they are not intended to limit broad aspects of the invention as set forth in the appended claims.

DETAILED DESCRIPTION

In the following detailed description, all temperatures and pressures are approximate.

Figure 1:
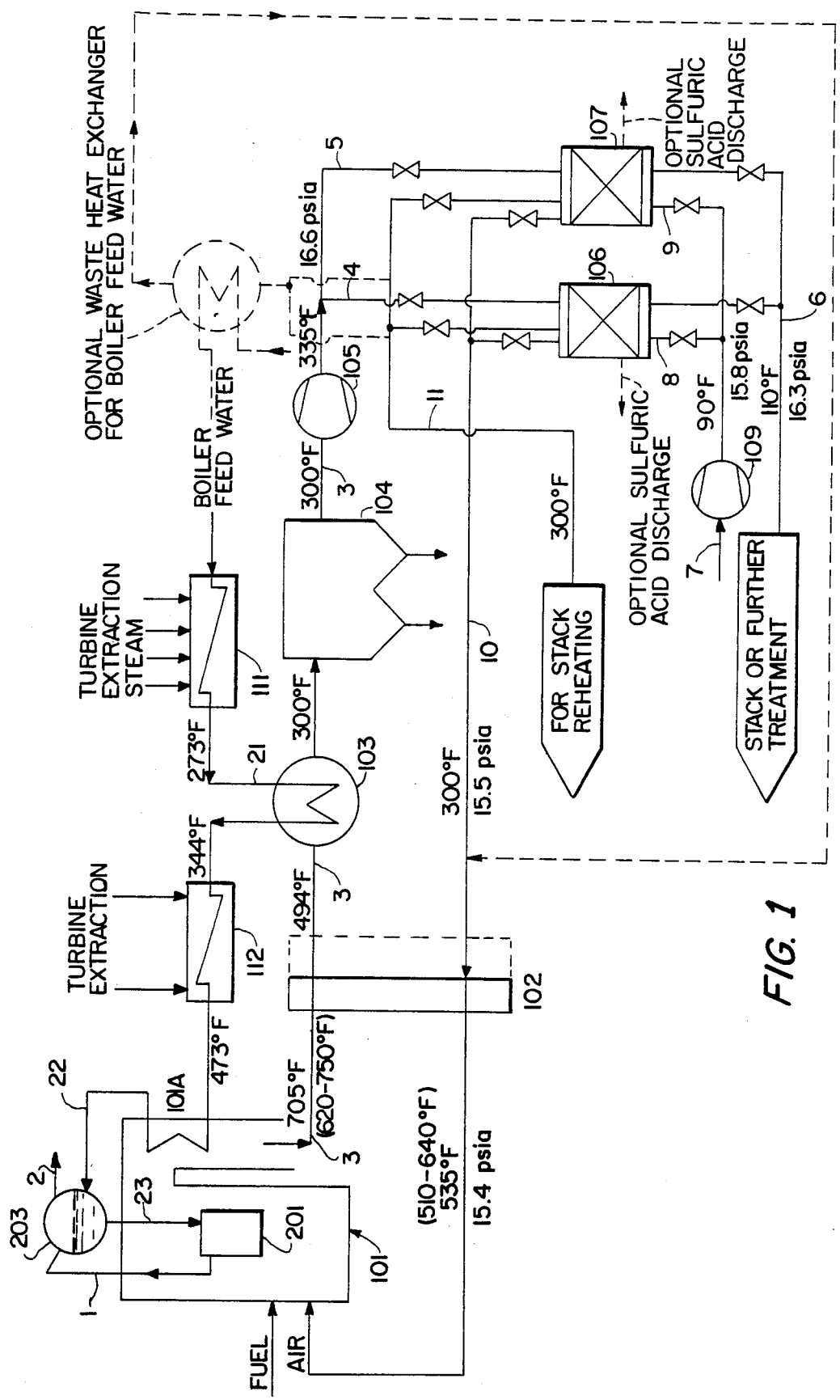
FIG. 1 is a schematic flow sheet of the most preferred embodiment covering a system wherein the flue gas first passes through a combustion air preheater and a waste heat exchanger for boiler feed water prior to entering a particulate removal unit from where it is passed to a regenerator system.

In FIG. 1, fuel and air are combined in furnace 101 to heat boiler 201 which heats boiler feed water to form steam which is then passed to vessel 203 via conduit 1 with the resultant steam being withdrawn via conduit 2 for eventual superheating and use in turbines in the conventional manner.

The flue gas from the furnace traverses economizer 101A where the feed water is raised in temperature on its way to vessel 203, thus lowering the flue gas temperature, improving boiler efficiency, and saving fuel. The resultant flue gas is withdrawn via conduit 3 at about 620°–750° F., probably about 705° F., and is passed through a preheater 102 of the Ljungstrom design where it preheats combustion air while being cooled to about 494° F. The dashed line to the right of the preheater is shown to indicate that in this embodiment of the invention, the preheater is decreased in thickness as compared to a preheater of the required dimensions in a system wherein regenerators are not employed. The flue gas then continues via conduit 3 into waste heat exchanger 103 wherein it is cooled to about 300° F. while being in indirect heat exchange with boiler feed water. In both preheater 102 and waste heat exchanger 103, the heat exchange surfaces are subject to attack by sulfuric acid, it thereby being incumbent that temperatures above the condensation temperature of sulfuric acid be maintained. The flue gas is then withdrawn from waste heater exchanger 103 and subjected to particulate separation in a particulate removal unit 104 which is of the conventional type, i.e. an electrostatic precipitator or baghouse. The resultant solids-depleted flue gas is then compressed somewhat in blower 105 to 16.6 p.s.i.a., thereby increasing the temperature of the flue gas to 335° F. This compressed flue gas is then passed through one of conduits 4 or 5, dependent on the time sequence of the regenerators 106 and 107. These regenerators contain sulfuric acid-resistant packing, and the details thereof are described in the aforesaid article by Dr. G. Linde in Linde Reports on Science and Technology, 34/1982. In the regenerator, the flue gas releases its heat and is withdrawn through conduit 6 at about 110° F. and 16.3 p.s.i.a. This cooled gas can be subjected to a flue gas desulfurization unit downstream or can be otherwise disposed of.

The heat from the flue gas is recovered by passing ambient air into compressor 109 where it is compressed to 15.3 p.s.i.a. at a temperature of about 90° F. from where it is passed through one of the regenerators 106 or 107 via conduit 8 or conduit 9 after the respective regenerator has been heated by flue gas. The now heated air is withdrawn from the regenerators in conduit 10 and is passed at 300° F. and about 15 p.s.i.a. through preheater 102 where it is heated to about 510°-640° F., preferably 535° F. The resultant combustion air is withdrawn from the preheater at about 14.9 p.s.i.a., and is then passed into furnace 101.

In view of the fact that the flue gas has a higher heat capacity than air, there is an excess of heat with respect to the heat balance between the flue gas and the air. Consequently, in addition to combustion air being withdrawn at 300° F., the regenerator also supplies such excess air at 300° F. via conduit 11. This excess air can be used wherever desirable, preferably for reheating the cooled desulfurized flue gas by direct admixture therewith. This latter step facilitates removal of the heated flue gas through the stack.

During the step of heating the ambient air in the regenerators, condensed sulfuric acid is removed therewith. Because the sulfuric acid is at above the condensation temperature, it does not cause a corrosion problem in the preheater 102. Furthermore, as explained in Dr. Linde's article, supra, the $SO_3$ is decomposed so as to form $SO_2$ and oxygen in the furnace 101. This means that no special provisions are required in this embodiment to remove condensed $H_2SO_4$ from the regenerators, and since the entire sulfur entrained in the fuel appears downstream of the regenerators as $SO_2$, the use of regenerators does not result in any $H_2SO_4$ pollution problems.

The boiler feed water, after being heated with turbine extraction steam in heat exchanger 111, is passed via conduit 21 into the waste heat exchanger 103 where it is heated from 273° F. to 344° F. It is then passed into another heat exchanger 112, where it is heated to 473° F., and from there it is passed through economizer 101A, and then into vessel 203 via conduit 22 and into the evaporator 201 via conduit 23.

Figure 2:
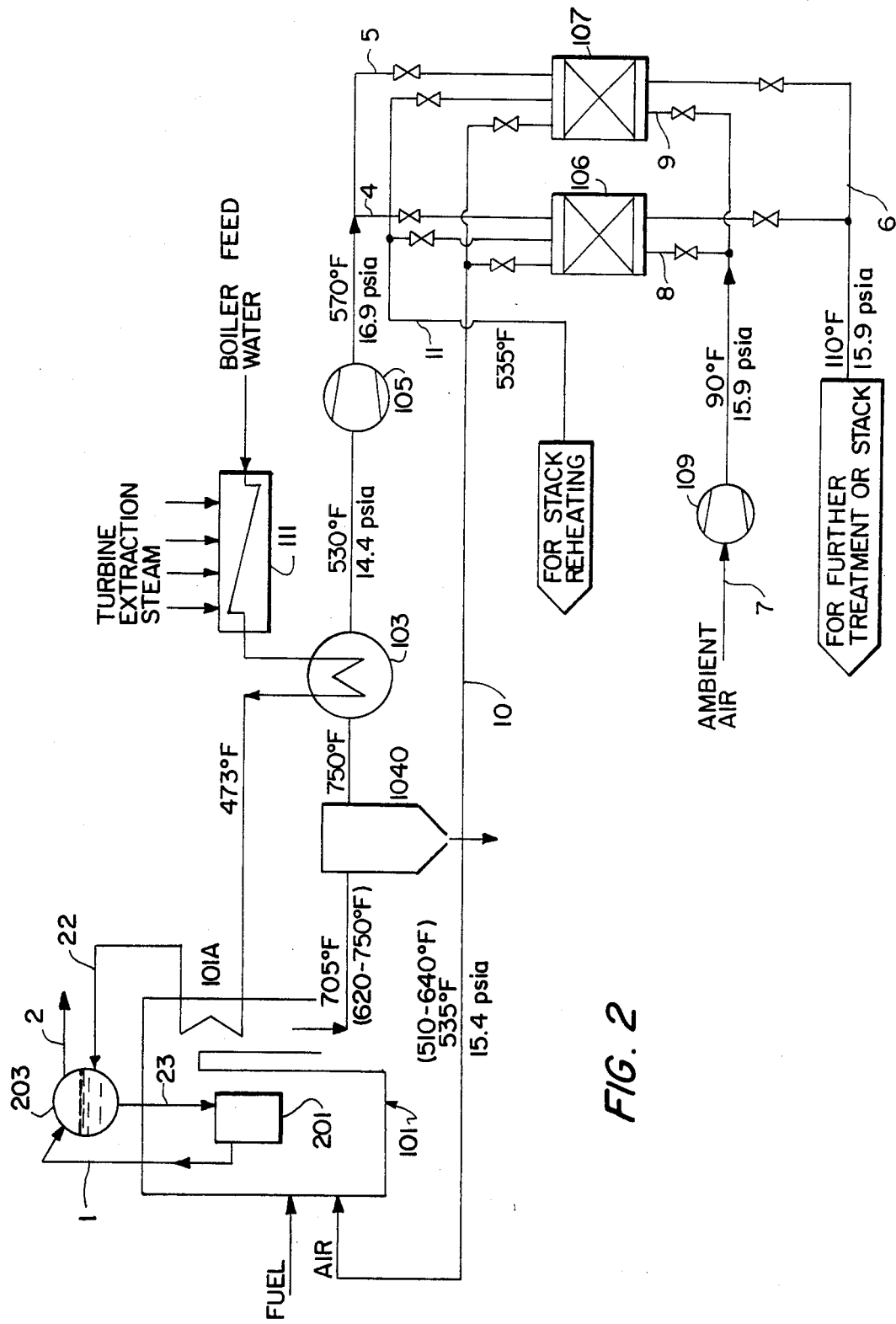
FIG. 2 is also a schematic flow sheet illustrating a system wherein the flue gas first passes through a high temperature particle separator and then a waste heat exchanger for boiler feed water prior to being sent to the regenerator system.

Referring to FIG. 2, the same reference numbers refer to the same pieces of equipment. In this system, however, a high temperature particle separator 1040 is employed to treat the flue gas withdrawn from the economizer at 620°-750° F., especially 705° F. The solids-depleted flue gas is then cooled in waster heat exchanger 103 to about 530° F. at 14.4 p.s.i.a. It is thereafter compressed in blower 105 to 16.9 p.s.i.a. while raising the temperature thereof to 570° F., and the slightly compressed gas is then passed through the regenerator system 106 and 107 as explained in connection with FIG. 1. However, in this instance, the combustion air that is withdrawn from the regenerators is at a temperature of 510°-640° F., especially 535° F., and at a pressure of 14.9 p.s.i.a., and as such, the hot combustion air is passed to the furnace 101 without the necessity of traversing a preheater as in the case of FIG. 1. The excess combustion air withdrawn in conduit 11 is also at a temperature of 535° F.

It will further be noted that heat exchanger 112 is not used in FIG. 2. Consequently, by virtue of the use of the high temperature particle separator and the regenerator system, it is possible to eliminate the expense required for a preheater and a boiler feed water heat exchanger.

The preferred high temperature particle separator is the Lindhardt separator discussed above; however, other high temperature particle separators can also be used.

It is to be understood, moreover, that in embodiments 1 and 2, the turbine generator cycle will require minimal modification on the one hand, and the temperature of the boiler feedwater entering the waste heat exchanger 103 will be optimized for each application.

It is to be further understood that the embodiments of FIGS. 1 and 2 are for purposes of illustration only inasmuch as a power plant using 2 or more turbines or using different boiler feed water pumping and heating schemes can also be adapted to the present invention.

Still further, it is to be understood that the technique for providing a continuous and uniform feed of combustion air from the regenerators, as set forth in Dr. Linde's article in Linde Reports on Science and Technology, 34/1982, can also be used in the present invention.

It is to be further understood that this invention is also applicable to the recovery of heat from flue gas even where a particulate separator is not required. For example, in natural gas fired furnaces the regenerators and waste heat exchanger can still serve the function of recovering and utilizing the heat as well without subjecting the heat exchangers to sulfuric acid attack.

There are many conventional acid resistant ceramics which can be used satisfactorily for the regenerator packing, an example of a commercial type being porcelain or stoneware.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. A method of recovering waste heat from flue gas containing particulate solids, $CO_2$, $SO_2$, $SO_3$, and $H_2O$, said process comprising:

(a) passing hot flue gas over heat exchange surface attackable by sulfuric acid, so as to release heat to said heat exchange surface and to partially cool said flue gas to a temperature within the range of about 350° F. to above the condensation temperature of sulfuric acid;

(b) passing resultant partially cooled flue gas through a waste heat exchanger in indirect heat exchange contact with boiler feed water to preheat the boiler feed water and to further cool the flue gas to another temperature still above the condensation temperature of sulfuric acid;

(c) passing resultant further partially cooled flue gas through a particulate removal zone to separate the particulate solids from the partially cooled flue gas, and compressing resultant solids-depleted partially cooled flue gas to thereby raise the temperature thereof; and (d) passing resultant compressed solids-depleted flue gas to a regenerator system containing heat exchange surfaces resistant to attack by sulfuric acid to release additional heat and to cool said flue gas to a temperature below the condensation temperature of sulfuric acid, thereby depositing sulfuric acid on said heat exchange surfaces.

2. A method of recovering waste heat from flue gas containing particulate solids, $CO_2$, $SO_2$, $SO_3$, and $H_2O$, said process comprising:

(a) passing hot flue gas in indirect heat exchange with combustion air in an air preheater having a heat exchange surface attackable by sulfuric acid, so as to release heat to said heat exchange surface and to partially cool said flue gas to a temperature within the range of about 350° F. to above the condensation temperature of sulfuric acid;

(b) passing resultant partially cooled flue gas through a waste heat exchanger in indirect heat exchange contact with boiler feed water to preheat the boiler feed water and to further cool the flue gas to another temperature still above the condensation temperature of sulfuric acid;

(c) passing resultant further partially cooled flue gas through a particulate removal zone to separate the particulate solids from the partially cooled flue gas; and (d) passing resultant solids-depleted, partially cooled flue gas in heat exchange contact with combustion air in a regenerator system containing heat exchange surfaces resistant to attack by sulfuric acid, to release additional heat and to cool said flue gas to a temperature below the condensation temperature of sulfuric acid, thereby depositing sulfuric acid on said heat exchange surfaces, and to preheat the combustion air, and then passing the thus-preheated combustion air to further heating in step (a) in said air preheater, and wherein during the step of preheating combustion air in the regenerator system, condensed sulfuric acid is removed therewith and passed with the preheated air to further heating in step (a), and then to a furnace generating the flue gas wherein $SO_3$ entrained in the combustion air fed to the furnace is decomposed to form $SO_2$ and oxygen, and whereby due to the temperature of the preheated air being above the sulfuric acid dewpoint, the sulfuric acid does not condense on preheater surfaces of step (a) and no special provisions are required to remove condensed $H_2SO_4$ from the regenerator system.

* * * * *